(12) United States Patent
Stephens et al.

(10) Patent No.: US 9,097,601 B2
(45) Date of Patent: Aug. 4, 2015

(54) METHOD AND SYSTEM FOR ASSESSMENT OF PIPELINE CONDITION

(75) Inventors: Mark Stephens, South Australia (AU); Martin Lambert, South Australia (AU); Angus Simpson, South Australia (AU); Young-il Kim, South Australia (AU); John Vitkovsky, Queensland (AU)

(73) Assignee: ADELAIDE RESEARCH & INNOVATION PTY LTD., Adelaide (AU)

( * ) Notice: Subject to any disclaimer, the term of this patent is extended or adjusted under 35 U.S.C. 154(b) by 1107 days.

(21) Appl. No.: 13/058,915

(22) PCT Filed: Aug. 13, 2009

(86) PCT No.: PCT/AU2009/001051
§ 371 (c)(1),
(2), (4) Date: Aug. 8, 2011

(87) PCT Pub. No.: WO2010/017599
PCT Pub. Date: Feb. 18, 2010

(65) Prior Publication Data
US 2012/0041694 A1 Feb. 16, 2012

(30) Foreign Application Priority Data
Aug. 15, 2008 (AU) ............................... 2008904224

(51) Int. Cl.
*G01N 11/00* (2006.01)
*G01M 5/00* (2006.01)
*G01B 17/02* (2006.01)
*G01M 3/28* (2006.01)

(52) U.S. Cl.
CPC ............ *G01M 5/0025* (2013.01); *G01B 17/02* (2013.01); *G01M 3/2815* (2013.01); *G01M 5/0033* (2013.01)

(58) Field of Classification Search
CPC combination set(s) only.
See application file for complete search history.

(56) References Cited

U.S. PATENT DOCUMENTS

| | | | |
|---|---|---|---|
| 6,171,025 B1 * | 1/2001 | Langner et al. | 405/154.1 |
| 6,727,695 B2 * | 4/2004 | Krivoi et al. | 324/263 |
| 8,310,251 B2 * | 11/2012 | Orazem | 324/713 |

FOREIGN PATENT DOCUMENTS

| | | |
|---|---|---|
| GB | 2444955 | 6/2008 |
| WO | 2006/136013 | 12/2006 |

OTHER PUBLICATIONS

Lambert, M.F. et al., "A review of leading-edge leak detection techniques for water distribution systems ", 20th Federal Convention, Australian Water Association, Ozwater, Perth, Apr. 6-10.

(Continued)

*Primary Examiner* — Elias Desta
(74) *Attorney, Agent, or Firm* — Greenblum & Bernstein, P.L.C.

(57) ABSTRACT

A method and system for assessing the condition of a pipe carrying a fluid is disclosed. The method includes the steps of generating a pressure wave in the fluid being carried along the pipe and detecting a pressure wave interaction signal resulting from an interaction of the pressure wave with a localized variation in pipe condition. The method then involves determining from the timing of the pressure wave interaction signal the location of the localized variation in pipe condition and the extent of the localized variation in pipe condition based on a characteristic of the pressure wave interaction signal.

20 Claims, 14 Drawing Sheets

(56) References Cited

OTHER PUBLICATIONS

Lee, P.J. et al., "Experimental verification of the frequency response method for pipeline leak detection", Journal of Hydraulic Research; 44(5): 693-707.

Wang, X. J. et al., "Leakage Detection in Pipelines using the Damping of Fluid Transients ", J. Hydraul. Eng. 128,697.

Wang, X.J. et al., "Simulation of Transients in a Looped Laboratory Network ", Pumps, Electromechanical Devices and Systems Applied to Urban Water Management, vol. 11, E. Cabrera and E. Cabrera Jr. (eds), Apr. 22-25, Valencia, Spain,pp. 791-798.

Wylie et al., "Fluid Transients in Systems", pp. 494-505, Prentice Hall Inc., Englewood Cliffs, New Jersey, USA (1993).

Vitkovsky et al., "Efficient and Accurate Calculation of Zielke and Vardy-Brown Unsteady Friction in Pipe Transients ", 9th International Conference on Pressure Surges, BHR Group, Chester, UK (2004).

Zielke, "Frequency-Dependent Friction in Transient Pipe Flow", Journal of Basic Engineering, Transactions of the ASME, 90(1), pp. 109-115 (1968).

Stephens, "Transient Response Analysis for Fault Detection and Pipeline Wall Condition Assessment in Field Water Transmission and Distribution Pipelines and Networks ", PhD Thesis, The University of Adelaide, School of Civil, Environmental and Mining Engineering, Adelaide, South Australia (2008).

Stephens et al., "Internal Wall Condition Assessment for Water Pipelines Using Inverse Transient Analysis ", Proceedings of the 10th Annual Water Distribution Systems Analysis Conference (WSDA), Kruger National Park, South Africa (2008).

Lambert et al., "Water Pipeline Condition Assessment Using Transient Response Analysis", 2005 Modelling Workshop, 47th Annual Conference and Expo, New Zealand Water and Wastes Association, Auckland, Septemeber (2005).

Misiunas, Dalius, "Failure Monitoring and Asset Condition Assessment in Water Supply Systems ", Lund University, Department of Industrial Electrical Engineering and Automation (2005).

Lambert et al., "Condition Assessment of Water Transmission Pipelines Using Hydraulic Transients", Conference on Computing and Control for the Water Industry (CCWI), Exeter, UK, (2005).

Cawley et al., "Acoustic Waver Propagation in Buried Iron Water Pipes", Proc. R. Soc. Lond. A.; vol. 459, pp. 2749-2770, (2003).

Long, R. et al., "Acoustic wave propagation in buried iron water pipes", Proceedings of the Royal Society of London Series A-Mathematical Physical and Engineering Science, ISSN: 1364-5021, vol. 459, Issue: 2039, 2003, pp. 2749-2770.

Lambert, M.F. et al., "A review of leading-edge leak detection techniques for water distribution systems ", 20th Federal Convention, Australian Water Association, Ozwater, Perth, Apr. 6-10, 2003.

Lee, P.J. et al., "Experimental verification of the frequency response method for pipeline leak detection", Journal of Hydraulic Research; 44(5): 693-707, 2006.

Vitkovsky, J. P., "inverse analysis and modeling of unsteady pipe flow: theory, applications and experimental verification", Department of Civil and Environment Engineering, University of Adelaide (2001).

Wang, X. J., "Leakage and blockage detection in pipelines and pipe network systems using fluid transients ", Department of Civil and Environmental Engineering, University of Adelaide (2003).

Wang, X. J. et al., "Leakage Detection in Pipelines using the Damping of Fluid Transients ", J. Hydraul. Eng. 128, 697, Jul. 2002.

Wang, X.J. et al., "Simulation of Transients in a Looped Laboratory Network ", Pumps, Electromechanical Devices and Systems Applied to Urban Water Management, vol. II, E. Cabrera and E. Cabrera Jr. (eds), Apr. 22-25, Valencia, Spain, pp. 791-798.

Stephens M.L., Lambert M.F., Simpson A.R., Vitkovsky J.P. and Nixon J. "Field tests for leakage, air pocket and discrete blockage detection using inverse transient analysis in water distribution pipes", Proceedings of the 6th Annual Symposium on Water Distribution Systems Analysis, ASCE, Salt Lake City, USA (2004).

\* cited by examiner

METHOD AND SYSTEM FOR ASSESSMENT OF PIPELINE CONDITION

CLAIM OF PRIORITY

The present application for patent claims priority from Australian Provisional Patent Application No. 2008904224 entitled "METHOD AND SYSTEM FOR ASSESSMENT OF PIPELINE CONDITION", filed 15 Aug. 2008, which is hereby expressly incorporated by reference herein in its entirety.

TECHNICAL FIELD

The present invention relates to the assessment of the condition of a pipe carrying a fluid. In a particular form the present invention relates to a method and system for the assessment of localised variations in pipeline condition.

INCORPORATION BY REFERENCE

The following documents are referred to in the following description:
- Wylie, E. B. and Streeter, V. L. (1993) *Fluid Transients in Systems*, Prentice Hall Inc., Englewood Cliffs, N.J., USA,
- Zielke, W. (1968) Trequency-Dependent Friction in Transient Pipe Flow' *Journal of Basic Engineering*, Transactions of the ASME, 90(1), 109-115,
- Vitkovsky, J., Stephens, M., Bergant, A., Lambert, M. F. and Simpson, A. R. (2004) 'Efficient and Accurate Calculation of Zielke and Vardy-Brown Unsteady Friction in Pipe Transients' $9^{th}$ *International Conference on Pressure Surges*, BHR Group, Chester, UK,
- Stephens, M. L. (2008) Transient Response Analysis for Fault Detection and Pipeline Wall Condition Assessment in Field Water Transmission and Distribution Pipelines and Networks, PhD Thesis, The University of Adelaide, School of Civil, Environmental and Mining Engineering, Adelaide, South Australia; and
- Stephens, M. L., Simpson, A. R. and Lambert, M. F. (2008) "Internal Wall Condition Assessment for Water Pipelines Using Inverse Transient Analysis", Proceedings of the 10th Annual Water Distribution Systems Analysis Conference WDSA 2008, Van Zyl, J. E., Hemobade, A. A., Jacobs, H. E. (eds.), Aug. 17-20, 2008, Kruger National Park, South Africa.

The entire contents of each of these documents are hereby incorporated by reference.

BACKGROUND

One of the main infrastructure items or assets of water or sewerage utilities is their pipeline network which functions to deliver or carry away fluids from discrete locations. Similarly, pipes and pipeline networks may be used to convey any number of types of fluids ranging from petroleum products to natural gas. Pipes in these networks may be located either above or below ground depending on requirements. Corrosion can occur on the inside wall of metallic pipes when protective linings deteriorate over time resulting in the subsequent formation of tubercules. Corrosion can also occur on the outside wall of metallic pipes when protective linings deteriorate over time with subsequent conversion of metal into corrosive by-products and pits. In the case of cement pipes, cement leaching can occur due to exposure (either internal or external) to soft water. Both of these effects can cause a wall thickness reduction or loss of elastic stiffness in the pipe wall resulting in a weakness at that location. These weaknesses increase the likelihood of a pipeline burst.

The consequences of a pipeline burst or failure, especially in the case of a large capacity pipe may often be catastrophic resulting in a serious disruption to those relying on the pipeline. As a result, a large amount of effort is often expended by utilities or other entities that manage pipe networks to determine the condition of pipes, and where a problem is detected, then engage in preventative maintenance. With the increasing age of many pipeline networks this task of ongoing maintenance is important in ensuring their reliability.

There are a number of different methods that are used to assess pipeline condition. The most intrusive method involves taking physical samples from a pipe section to determine the extent of any corrosion or cement leaching (this is termed "coupon sampling"). This destructive testing is not preferred by industry and requires the exposure of buried pipes and their subsequent repair after the coupon sample is obtained. Closed circuit television (CCTV) camera investigation is sometimes used but generally requires intrusive access and allows for only a visual classification of the extent of pipe wall deterioration.

Other non-destructive methods involve the use of ultrasonic gauge testing along a pipe to directly determine the wall thickness at a given location. This method however, relies on the pipe location being exposed i.e. the pipe is either above ground or excavation has been carried out to expose a section of pipe. In addition, this method will often rely on an initial estimate as to the location of an area of concern otherwise the cost and time involved in testing a large section at a series of discrete locations along the pipe is prohibitive. Both destructive coupon sampling and ultrasonic gauge testing provide information only at specific locations which may not coincide with points of damage to pipe walls. As a consequence, the condition of the pipe away from the sample or test locations can only be inferred using these methods.

Another method of non-destructive testing involves the transmitting of an acoustic signal along a pipe from a first location and then detecting these same signals at a location farther down the pipe. By noting the average propagation velocity of the acoustic signal as it travels from transmitter to detector, inferences may be drawn as to the average pipe condition along that section of pipe. While this process has the advantages of being non-destructive, it still is only able to provide a cumulative measure of pipe quality over the section being tested between measurement locations and hence is unable to indicate the location where weakness in the pipe wall may occur.

As a consequence, a large section of pipe may end up being needlessly replaced on the basis of this "average" measure. This is due to the distribution of pipe wall damage being often highly variable and often manifesting at individual localised sections of pipe that have a defect from manufacture or installation. Clearly, entities involved in the management of pipeline networks are focussed on finding and replacing these weak sections as opposed to the expensive process of replacing entire lengths of pipeline.

There is therefore a need for a method and system for assessing the condition of a pipe which allows improved location of potential variations in pipe condition.

SUMMARY

In a first aspect the present invention accordingly provides a method for assessing the condition of a pipe carrying a fluid, the method including the steps of:

generating a pressure wave in the fluid being carried along the pipe;

detecting a pressure wave interaction signal resulting from an interaction of the pressure wave with a localised variation in pipe condition;

determining from the timing of the pressure wave interaction signal the location of the localised variation in pipe condition; and determining the extent of the localised variation in pipe condition based on a characteristic of the pressure wave interaction signal.

In another embodiment, the characteristic of the pressure wave interaction signal is a change in the magnitude of the pressure wave interaction signal.

In another embodiment, the localised variation in pipe condition includes a variation in elastic stiffness of the pipe wall.

In another embodiment, the localised variation in pipe condition includes a variation in thickness of the pipe wall.

In another embodiment, the localised variation in pipe condition includes a variation of internal cross sectional area of the pipe wall.

In another embodiment, the step of generating a pressure wave includes changing the pressure and/or flow characteristics of the fluid at a source location along the pipe.

In another embodiment, changing the pressure and/or flow characteristics includes discharging fluid from the pipe at the source location and then stopping this discharge.

In another embodiment, the pressure wave interaction signal is a pressure wave reflectance signal reflected from the localised variation in pipe condition towards the origin of the pressure wave.

In another embodiment, the pressure wave interaction signal is compensated for pressure effects caused by generating the pressure fluid in the pipe.

In another embodiment, the step of determining the location of the localised variation in pipe condition includes compensating for average wave speed in a pipe section of the pipe.

In another embodiment, the step of determining the extent of localised variation includes converting a change in magnitude of the pressure wave interaction signal to a localised variation in wave speed of the pressure wave.

In another embodiment, the method further includes converting the localised variation in wave speed of the pressure wave to a corresponding localised wall thickness.

In another embodiment, the step of determining the extent of the localised variation in pipe condition includes forming a transient model of the pipe to provide a predicted pressure wave interaction signal.

In another embodiment, the step of determining the extent of the localised variation in pipe condition further includes modifying the transient model to generate a predicted pressure wave interaction signal to match the detected pressure wave interaction signal.

In another embodiment, a global search procedure is employed in the step of modifying the transient model to generate a predicted pressure wave signal.

In a second aspect the present invention accordingly provides a method for assessing the condition of a pipe carrying a fluid, the method including the steps of:

generating at a source location a pressure wave in the fluid being carried along the pipe;

detecting a plurality of pressure wave interaction signals at respective measurement locations along the pipe, the plurality of pressure wave interaction signals resulting from an interaction of the pressure wave with a localised variation in pipe condition;

determining from the timing of the pressure wave interaction signals the location of the localised variation in pipe condition; and determining the extent of the localised variation in pipe condition based on a characteristic of the pressure wave interaction signals.

In another embodiment, the measurement locations include the source location.

In another embodiment, the step of determining the location of the localised variation in pipe condition includes compensating for average wave speeds in pipe sections located between the measurement locations.

In a third aspect the present invention accordingly provides a system for assessing the condition of a pipe carrying a fluid, the system including:

a pressure wave generator for generating a pressure wave in the fluid being carried along the pipe;

a pressure detector for detecting a pressure wave interaction signal resulting from an interaction of the pressure wave with a localised variation in pipe condition;

a data processor for determining from the timing of the pressure wave interaction signal the location of the localised variation in pipe condition and the extent of the localised variation in pipe condition based on a characteristic of the pressure wave interaction signal.

In a fourth aspect the present invention accordingly provides a system for assessing the condition of a pipe carrying a fluid, the system including:

a pressure wave generator located at a source location for generating a pressure wave in the fluid being carried along the pipe;

a plurality of pressure detectors for detecting a plurality of pressure wave interaction signals at respective measurement locations located along the pipe, the plurality of pressure wave interaction signals resulting from an interaction of the pressure wave with a localised variation in pipe condition;

a data processor for determining from the timing of the pressure wave interaction signals the location of the localised variation in pipe condition and the extent of the localised variation in pipe condition based on a characteristic of the pressure wave interaction signals.

BRIEF DESCRIPTION OF THE DRAWINGS

Illustrative embodiments of the present invention will be discussed with reference to the accompanying drawings wherein.

In the following description, like reference characters designate like or corresponding parts throughout the several views of the drawings.

DETAILED DESCRIPTION

Figure 1:
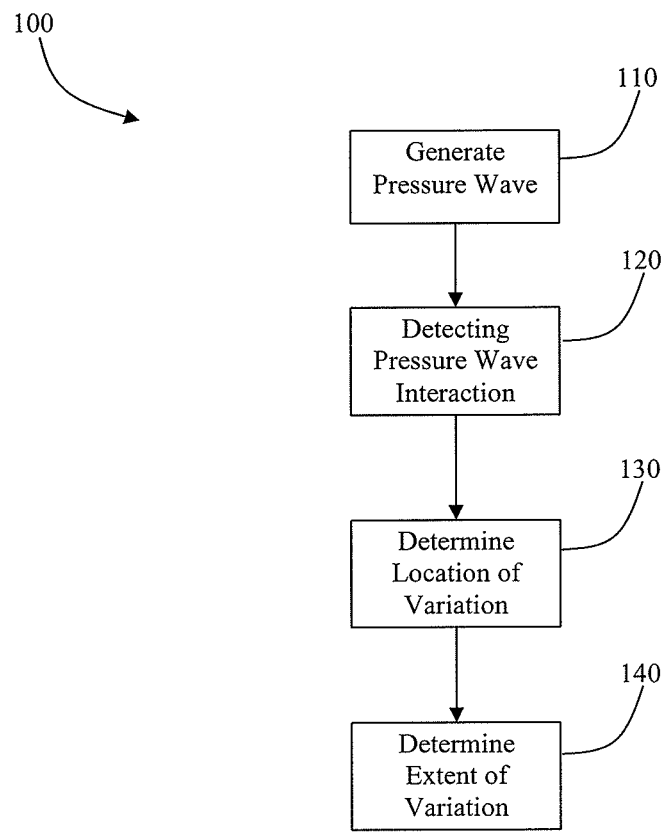
FIG. 1 is a flowchart diagram of a method for assessing the condition of a pipe carrying a fluid in accordance with an illustrative embodiment of the present invention.
Figure 2:
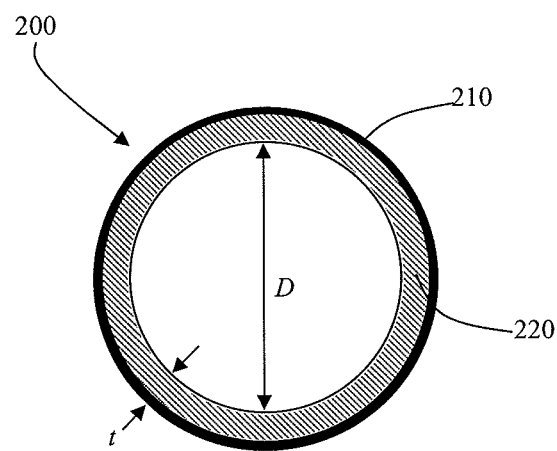
FIG. 2 is a sectional view of an example pipe whose condition may be assessed according to the method illustrated in FIG. 1.

Referring now to FIG. 1 there is shown a flowchart diagram of a method 100 for assessing the condition of a pipe carrying a fluid according to an illustrative embodiment of the present invention. In this illustrative embodiment, the pipe is of the type that is used as a transmission pipeline typically extending over hundreds of kilometers to carry large volumes of water for use by urban or agricultural centres. Referring now to FIG. 2, there is shown a sectional view of an exemplary mild steel cement mortar lined (MSCL) pipe 200 that includes an outer pipe wall 210 formed from mild steel and an inner lining 220 formed of cement mortar. In this example, pipe 200 has an outer diameter of 762 mm and an inner diameter of 727.5 mm with the thickness of the outer pipe wall 210 being 4.76 mm and the thickness of the cement mortar lining 220 being 12.5 mm. As has been described previously, the loss of the protective lining 220 from the inside of pipe 200 can result in further wall corrosion which directly affects the service lifetime of the pipe 200.

Referring once again to FIG. 1, at step 110 a pressure wave is generated in the fluid being carried along by the pipe. In this illustrative embodiment, a pressure wave is generated in pipe 200 by a pressure wave generator which operates to generate a discharge through an existing scour or fire plug/air valve and then abruptly stops this flow. This has the effect of progressively halting the flow of water along the pipe that had been established to the previously open discharge. This progressive halting of the flow of water along the pipeline is equivalent to the generation of a pressure wave resulting in the propagation of a transient wavefront along the pipe. Other means to generate a pressure wave include but are not limited to inline valve closure devices and piston chambers whereby an amount of fluid is drawn into a chamber containing a piston which is then operated.

In this illustrative embodiment dealing with a pipe for the transmission of water, typically 5000 L of water is first discharged to establish a relatively stable flow along the pipeline to the discharge point before shutting the scour or fire plug/air valve abruptly to generate the pressure wave and hence the transient wavefront. In this embodiment, shutting off the discharge is achieved using a custom built pressure generator mounted on the downstream side of the scour or fire plug/air valve. Where appropriate the discharged quantity of water can be captured and re-used such as where a discharge occurs in a metropolitan environment or where due to water scarcity it is important to conserve water.

In the example of a scour valve discharge location, the pressure wave generator includes a flange plate to suit the scour diameter, a ball valve and torsion spring device that mechanically powers its opening and closing operations and a regulating discharge nozzle (between 25-50 mm in diameter depending on static system pressure). In addition, 100 mm PVC discharge pipes are connected to the downstream side of the pressure wave generator in order to divert flow to a water tanker. The PVC discharge pipe is equipped with multiple inverted foot valves to relieve negative pressures within the discharge line, by facilitating air entrainment, after the pressure wave has been triggered. Two paddle wheel flow meters are also installed to monitor the discharge of water through the PVC pipe.

In some circumstances it is necessary to generate a pressure wave from a fire plug/air valve between two scour valves along an aboveground pipeline in order to get a more detailed pressure wave interaction signal from a particular section. Furthermore, underground pipelines can only typically be connected to via fire plug/air valves in chambers (this is particularly so for metropolitan pipelines). In these circumstances pressure waves are generated from fire plug/air valves with the pressure wave generator including a ball valve and torsion spring to abruptly halt discharge, a regulating nozzle and inverted foot valves and flow meters. Structural support of this apparatus is achieved via a strut arrangement to existing gusset plates located below the fire plug/air valve.

In another illustrative embodiment, a pressure wave may be generated by allowing a discharge of fluid to rapidly establish such as by venting a pipe using a large outlet aperture.

At step 120, a pressure wave interaction signal is detected from an interaction of the pressure wave with one or more localised variations in the condition of pipe 200. In this illustrative embodiment, a pressure detector is employed in the form of a pressure transducer in combination with a data logger. Generally, measurements are taken at strategically selected fire pug/air valves by the insertion of a dummy plug and connection of a pressure transducer. A small area is needed to setup the associated laptop computer, data acquisition unit and battery. The pressure wave detector incorporating the laptop and data acquisition unit are GPS synchronised with other measurement stations (both at the pressure wave generator and other fire plug/air valves functioning as measurement locations). Each measurement station is configured to record the pressure response of the pipeline following initiation of a transient for 4-6 minutes at between 2000 Hz and 10,000 Hz. The setup time for each measurement location is approximately 10 minutes.

As would be apparent to those of skill in the art, other types of pressure detection devices are contemplated to be within the scope of the invention. These include, but are not limited to pressure gauges and differential pressure gauges based on the venturi effect and hydrophone arrangements. In addition, pressure detection devices may be installed in-situ within the pipe and be operated remotely to record pressure variations at their location.

Figure 3:
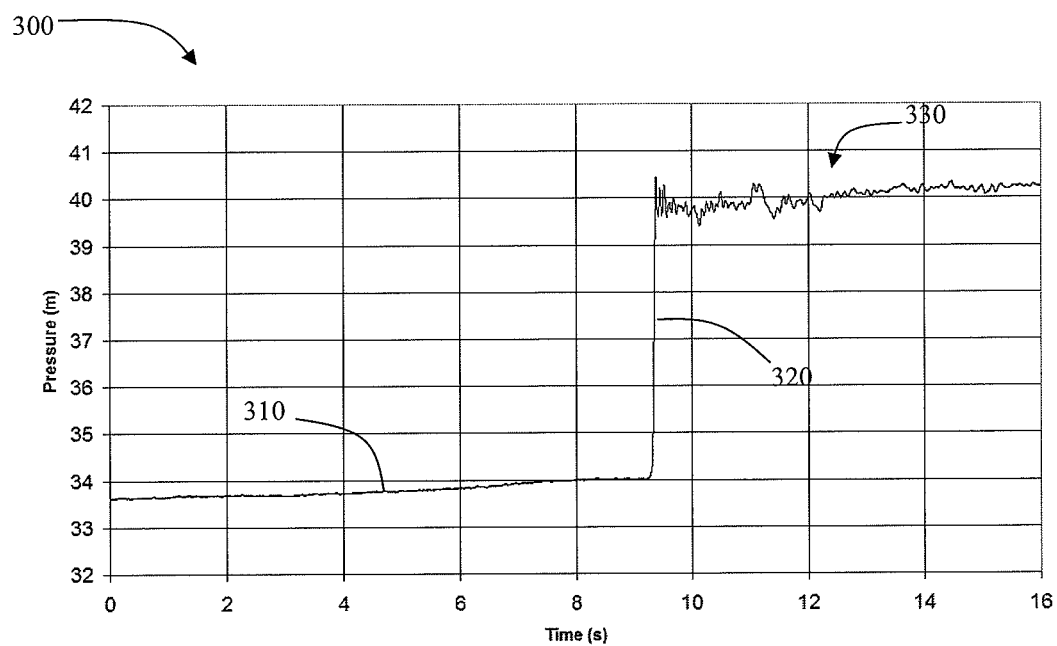
FIG. 3 is a plot of a pressure wave interaction signal detected in accordance with the method illustrated in FIG. 1.
Figure 4A:
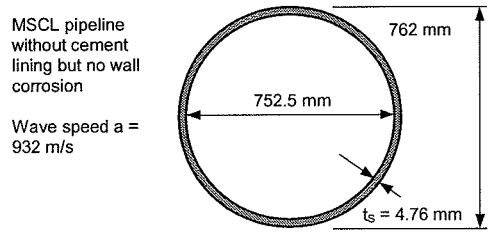
FIGS. 4a to 4d are cross-sectional views of the pipe illustrated in FIG. 2 depicting various levels of damage and the associated wave speed.
Figure 4B:
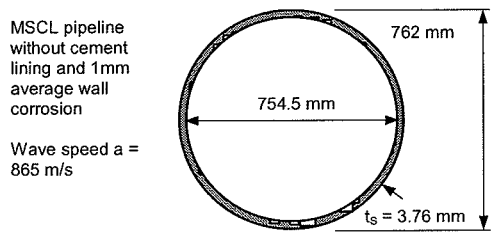
Figure 4C:
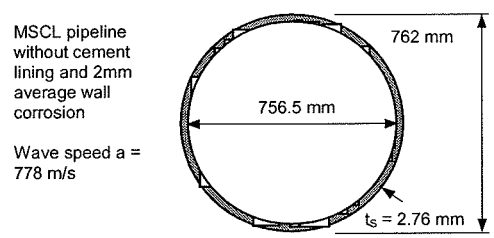
Figure 4D:
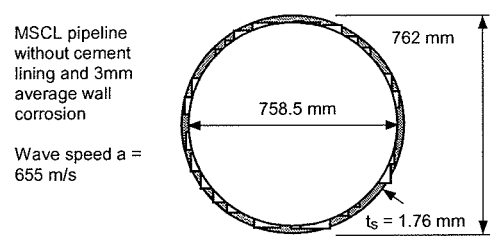

Referring now to FIG. 3, there is shown a graph of the pressure wave interaction signal 300 plotted as pressure head (in meters) as a function of time. Pressure wave interaction signal 300 consists of three distinct components including an initial non varying portion 310 where the pressure is substantially constant, a jump or pulse portion 320 where the pressure jumps as a result of the pressure wave being generated in the pipe 200 and a rapidly varying section 330 where variations in pressure are caused by reflections from localised variations in pipe condition such as damage to the wall of the pipe 200.

Referring once again to FIG. 1, at step 130 the location of a localised variation in pipe condition is determined by a timing analysis carried out on the varying section 330 of the pressure wave interaction signal 300. In this embodiment, an average wave speed is determined based on the expected physical characteristics of the pipe assuming a constant wall thickness. Based on this wave speed the location of variations in pipe condition can be determined by the time to peak change in magnitude of pressure associated with each variation and then converting this time to a corresponding distance along the pipe based on the assumed wave speed.

At step 140, the extent of localised variation in pipe condition or damage is determined. In one illustrative embodiment the extent of variation in pipe condition is determined by applying Joukowsky's equation to a pressure drop at a particular time in pressure wave interaction signal 300 to determine a localised variation in wave speed a of a pressure wave that travels in the fluid.

Joukowsky's equation states that:

$$\Delta H = -\frac{a}{g}\Delta V \quad (1)$$

where
a is the wave speed of a pressure wave that travels in the fluid along the pipe,
g is the gravitational constant,
ΔH is the measured magnitude of pressure head change of a specific reflection, and
ΔV is the change in velocity.

ΔV may be determined by use of flow meters to measure the discharge of fluid at the generation location as discussed previously and/or by theoretical calculations based on the size of the orifice through which the fluid discharges.

The wave speed a of a pressure wave that travels in a fluid along a pipe 200 can also be determined by the following formula (see for example Wylie, E. B. and Streeter, V. L. (1993) *Fluid Transients in Systems*, Prentice Hall Inc., Englewood Cliffs, N.J., USA, the contents of which are herein incorporated by reference in their entirety):

$$a = \sqrt{\frac{K/\rho}{1+(K/E)(D/t)c}} \quad (2)$$

where:
K is the bulk modulus of the water,
ρ is the density of the water,
E is the modulus of elasticity of the pipe wall,
t is the thickness of the pipe wall,
D is the internal diameter of the pipe; and
c is a restraint factor for the pipe which is 1 for a pipe with flexible joints and is equal to $1-v^2$ for a fully restrained pipe where v is Poisson's ratio. For practical considerations fully restrained means that the pipe includes welded or bolted flanged joints with external constraint collars and support saddles at regular spacing along the pipe.

From this relationship the wave speed a, determined using Joukowsky's equation, and the pressure drop measurement in the pressure wave interaction signal 300 (at a given time within the signal), can be used to determine the thickness of the material comprising the pipe wall and the internal diameter of the pipe. For cement mortar lined pipes, the thickness of cement mortar inner lining 220 can be converted to equivalent metal thickness using the ratio of the elastic modulus of the cement mortar to metal in the pipe wall. As an example, for pipe 200 illustrated in FIG. 2, the wave speed for a section of pipe having a 3/16 of an inch (4.76 mm) thick wall with integral cement mortar lining is theoretically 1015 m/s when the pipe is fully restrained as is the case for transmission pipes considered generally in these embodiments.

Referring now to FIGS. 4a to 4d, the effect of changes in wave speed a and pipe wall thickness can be seen for idealised physical characteristics of pipe 200 for four discrete levels of damage that include the pipeline without cement mortar lining (FIG. 4a) and with 1 mm (FIG. 4b), 2 mm (FIG. 4c) and 3 mm (FIG. 4d) of wall corrosion respectively. The change to internal pipeline diameter and the wave speed corresponding to each level of damage are also indicated and further tabulated in Table 1.

TABLE 1

| Level of Damage | Description of Damage | Internal Diameter (mm) | Cement Lining | Corroded Metal Thickness (mm) | Uncorroded Metal Thickness (mm) | Wave Speed (m/s) |
|---|---|---|---|---|---|---|
| 0 | Nil | 727.5 | Intact | 0 | 4.76 | 1015 |
| 1 | Loss of cement lining | 752.5 | None | 0 | 4.76 | 932 |
| 2 | 1 mm of corrosion | 754.5 | None | 1 | 3.76 | 865 |
| 3 | 2 mm of corrosion | 756.5 | None | 2 | 2.76 | 778 |

TABLE 1-continued

| Level of Damage | Description of Damage | Internal Diameter (mm) | Cement Lining | Corroded Metal Thickness (mm) | Uncorroded Metal Thickness (mm) | Wave Speed (m/s) |
|---|---|---|---|---|---|---|
| 4 | 3 mm of corrosion | 758.5 | None | 3 | 1.76 | 655 |

Accordingly, from the pressure wave interaction signal the location and extent of damage to the pipe can be determined.

Figure 5:
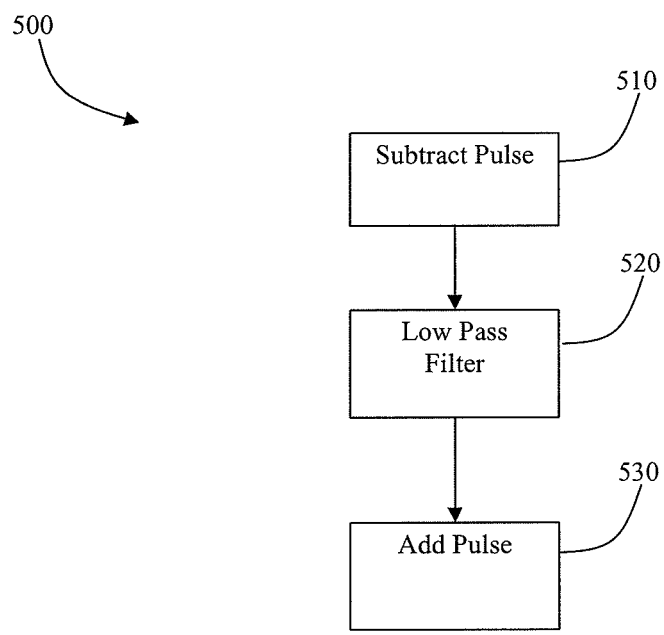
FIG. 5 is a flowchart diagram of a method for de-trending a pressure wave interaction signal in accordance with an illustrative embodiment of the present invention.

Referring now to FIG. 5, there is shown a flowchart diagram of a method 500 for compensating for pressure effects caused by generating the pressure wave in the fluid such as has been described. In some circumstances, quiescent or steady state flow conditions are not achieved before generating the pressure wave. This is usually due to limiting the quantity of discharge to ensure complete capture of the discharge. As a result, the generation of a pressure wave causes a long period oscillation of fluid pressure in the pipe resulting in the overall pressure either generally trending upwards or downwards depending on which part of the cycle the reflection response is measured.

In these circumstances, the analysis of the pressure wave interaction signal may be improved by removing these trends by a de-trending procedure. At step 510, the pulse portion of the pressure wave interaction signal associated with the arrival of the transient wavefront is first subtracted or removed from the pressure wave interaction signal. Following this at step 520, a low pass band filter is applied to the resultant signal and this smoothed response further subtracted from the resultant signal. At step 530 the pulse portion of the pressure wave interaction signal is then reintroduced to generate the resultant de-trended signal.

Figure 6:
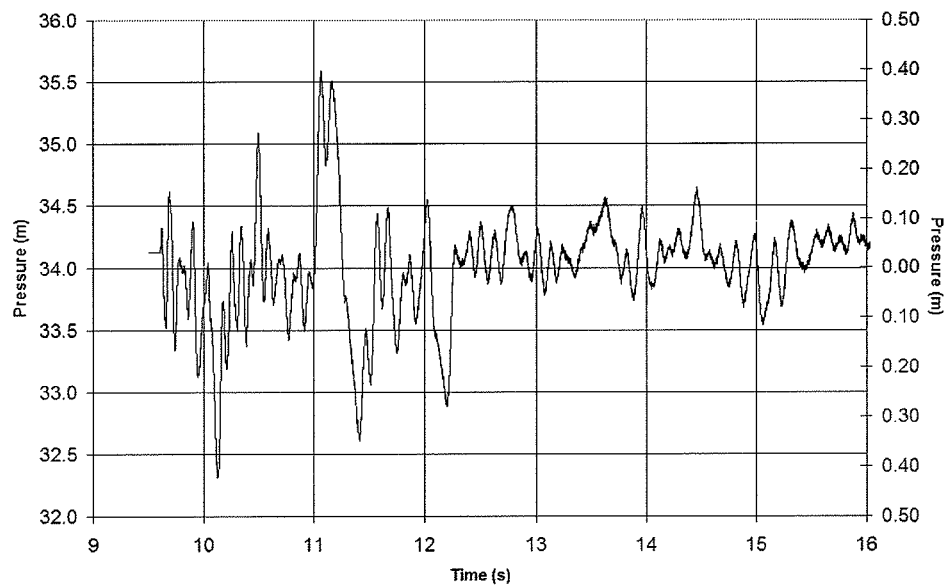
FIG. 6 is a plot of the pressure wave interaction signal illustrated in FIG. 3 following the de-trending process referred to in FIG. 5.
Figure 7:
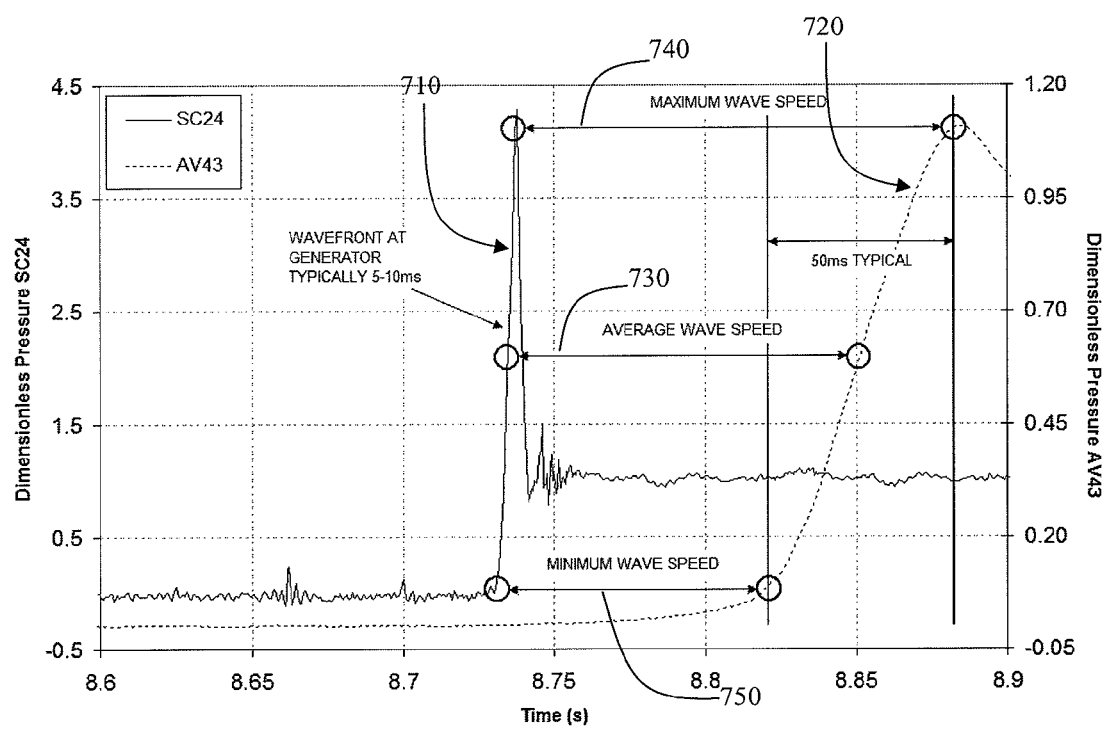
FIG. 7 is a plot showing the modification of a pressure wave interaction signal due to the average wave speed effects in a pipe.

Referring now to FIG. 6, there is shown a plot of the varying portion 330 of a de-trended version of the pressure wave interaction signal 300 illustrated in FIG. 3. This de-trended signal can then be used in the analysis to determine the extent of localised variation in pipe condition as described earlier.

Where there are significant variations in the average wave speed a for sections of pipe between individual measurement locations, a further improvement to determining the location of variations in pipe condition may be obtained by compensating for these variations in average wave speed. Referring now to FIG. 7, there is shown a graph of the pressure wave interaction signal 710 measured at the generation location and the pressure wave interaction signal 720 measured at a location spatially separated from the generation location. In this example, the structure of the pressure wave interaction signal can be seen to have changed with a widening of the original pulse portion corresponding to the initial pressure wave.

This change in structure may be used to determine an average wave speed of the pipe section between the initial generation location and the measurement location corresponding to pressure wave interaction signal 720. In this case, the initial pulse corresponding to the source location is measured and is sharp and approximately 7 ms long. By the time the wavefront reaches the measurement location it has dispersed to approximately 50 ms in length. The time difference 750 between the point at which the pressure front begins on both the initial pressure wave interaction signal 710 and the second pressure wave interaction signal 720 corresponds to the minimum wave speed in the pipe section with the time difference 740 between the respective ultimate pressure rises of both signals 710, 720 corresponding to the maximum wave speed in the pipe section. The average wave speed is calculated according to the time difference 730 that corresponds to the pressure front reaching 50% of the ultimate pressure rise for both signals 710, 720.

This average wave speed can then be employed to correct or compensate the measured pressure wave interaction signal to better determine the position of any damage. Where there are many measurement locations on a pipe the change in pulse shape can be determined with respect to any pair of measurement locations including the signal generation location by this method.

Figure 8:
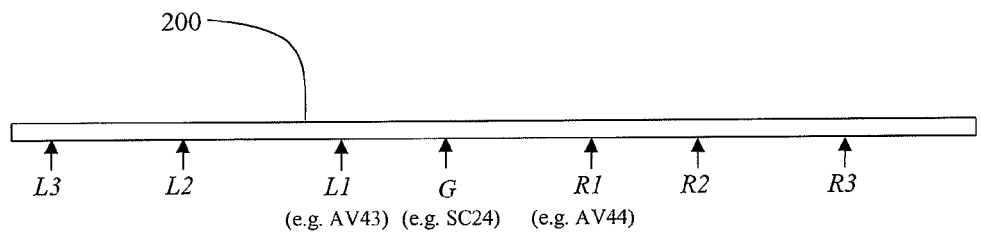
FIG. 8 is a schematic diagram of a longitudinal view of pipe depicting the location of the pressure generator and respective measurement locations.
Figure 9:
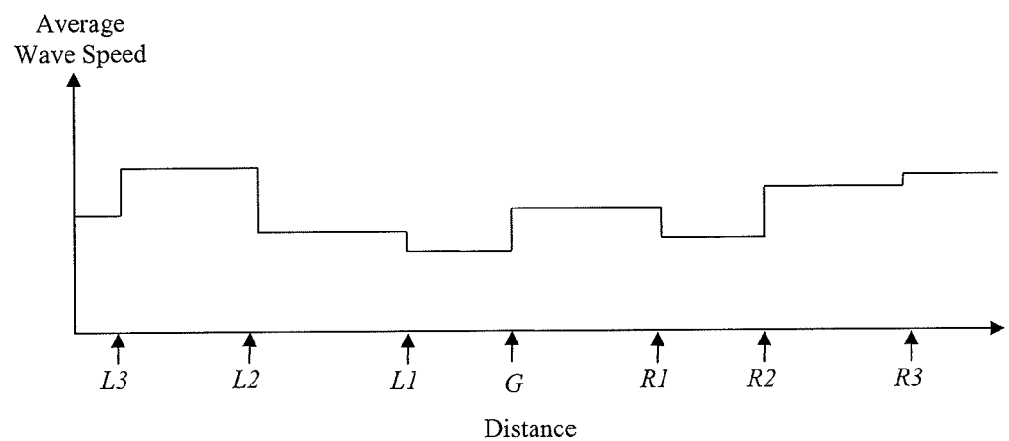
FIG. 9 is a plot of the average wave speed for pipe sections defined between measurement locations as depicted in FIG. 8.

Referring now to FIG. 8, there is shown a schematic representation of a longitudinal view of pipe 200 depicting a location G where a pressure wave is generated in pipe 200 and a series of measurement points R1, R2, R3 and L1, L2, L3 located to the right and left of sight of the generated pressure wave. As would be apparent to those skilled in the art, pipe 200 is not necessarily a straight linear section but may be comprised of a number of jointed pipes each having their own physical characteristics including changes of material, orientation and restraints such as being located either above or below ground. Referring now to FIG. 9, there is shown an example plot of the change in average wave velocity corresponding to pipe 200 as inferred by the pulse shape analysis described with respect to FIG. 7.

In the circumstances where there are multiple measurement locations, the pressure wave will travel in opposite directions from the pressure wave generation location G. A localised variation in pipe wall condition may be located either side of the generation location G and indeed could be located on either side of a measurement location. As has been described previously, the average wave speed a in a pipe section may vary as a measure of the overall condition of a pipe section, thereby causing a shifting of the time based pressure wave interaction signals depending on the average wave speed a of the pipe section that the pressure wave traverses.

Figure 10:
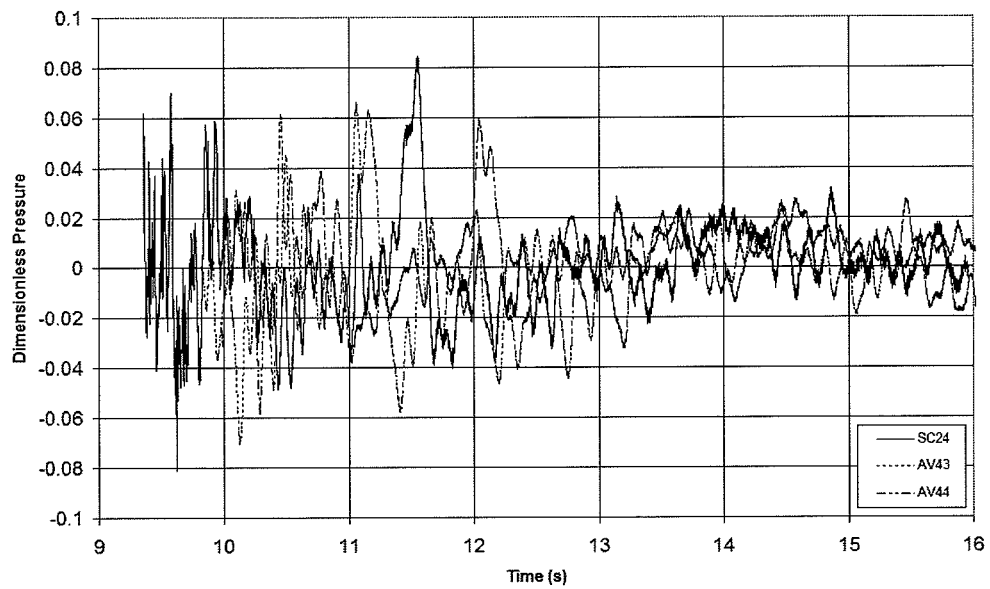
FIG. 10 is a plot of the measured pressure interaction signals for locations G, R1 and L1 as depicted in FIG. 8.

Referring now to FIG. 10, there are shown example pressure wave interactions signals as measured for generation point G and two measurements points R1 and L1 located to the right and left of generation respectively of location G. These interaction signals are from measurements taken on the field test pipeline which is located in South Australia and is approximately 86 km in length with the generation location corresponding to scour valve 24 (i.e. SC24) which is located 15 kms along the pipe. Measurement location R1 corresponds to fire plug air valve 44 (referred to as FPAV44 or AV44) which is upstream of G with measurement location L1 corresponding to fire plug air valve 43 (referred to as FPAV43 or AV43) which is located downstream of G. In this example, the pressure wave interaction signals corresponding to these locations show little or no correlation and in this form would be unsuitable to carry out an analysis to determine localised variations in pipe condition.

As has been described above, the variation in average wave speed may be determined for a pipe section. In one embodiment, as described with respect to FIG. 7, this average wave speed is determined by an analysis of the variation in pulse shape with respect to the original pulse shape of the generated pressure wave. In another embodiment, the initial pressure wave interaction signal 710 is modified based on an assumed velocity for the pipe section. This assumed velocity is then varied until a maximum correlation between the modified initial pressure wave interaction signal and the second pressure wave interaction signal 720 is obtained.

This average wave speed may be used to compensate the measured pressure wave interaction signal for a measurement location by a time shift based on the length of the pipe section divided by the average wave speed a for the pipe section. This time shift will either result in a forward shift or a lag shift to the respective pressure wave interaction signal and will allow signals from different measurement locations to be better correlated. A priori the location of a localised variation in pipe condition with respect to the generation location is not unknown. However, there are only two possible variations of time shifting that have the effect of compensating for time shifts that occur due to traversing pipe sections from the generation location to the measurement location.

Figure 11:
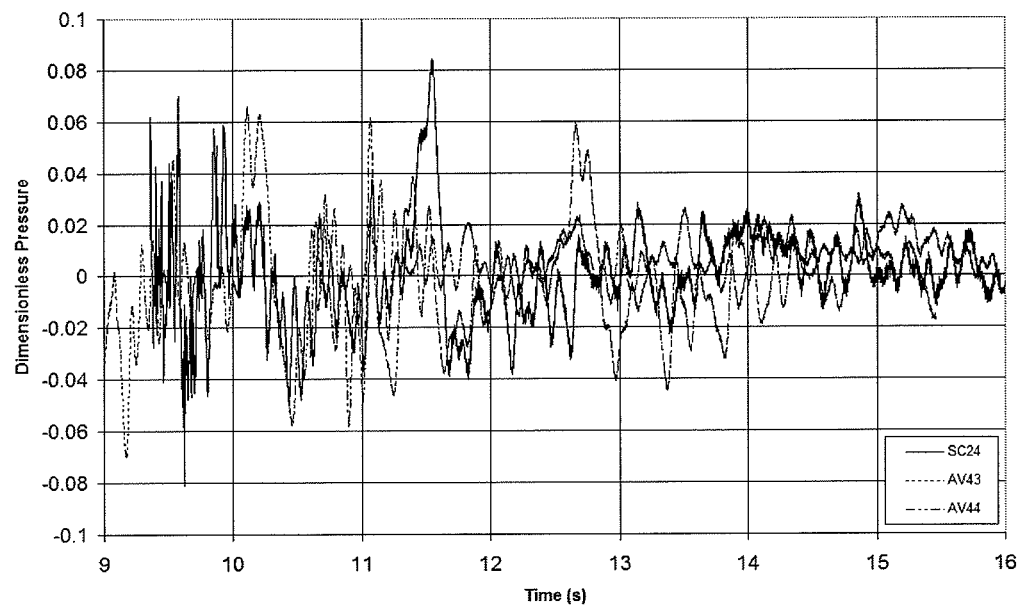
FIG. 11 is a plot of the measured pressure interaction signals illustrated in FIG. 1 after time shifting based on viewing variations in pipe condition to the right hand side of the generation location.

Referring now to FIG. 11, there is shown a plot of the pressure wave interaction signals after the pressure wave interaction signal associated with AV43 has been advanced and the signal associated with AV44 has been lagged. This has the effect of checking for or viewing variations of pipe condition to the right hand side of the generation location SC24. As is apparent from FIG. 11, there is no significant correlation of the pressure wave interaction signals from each location leading to the conclusion that there is no significant variation in pipe condition to the right hand side of SC24.

Figure 12:
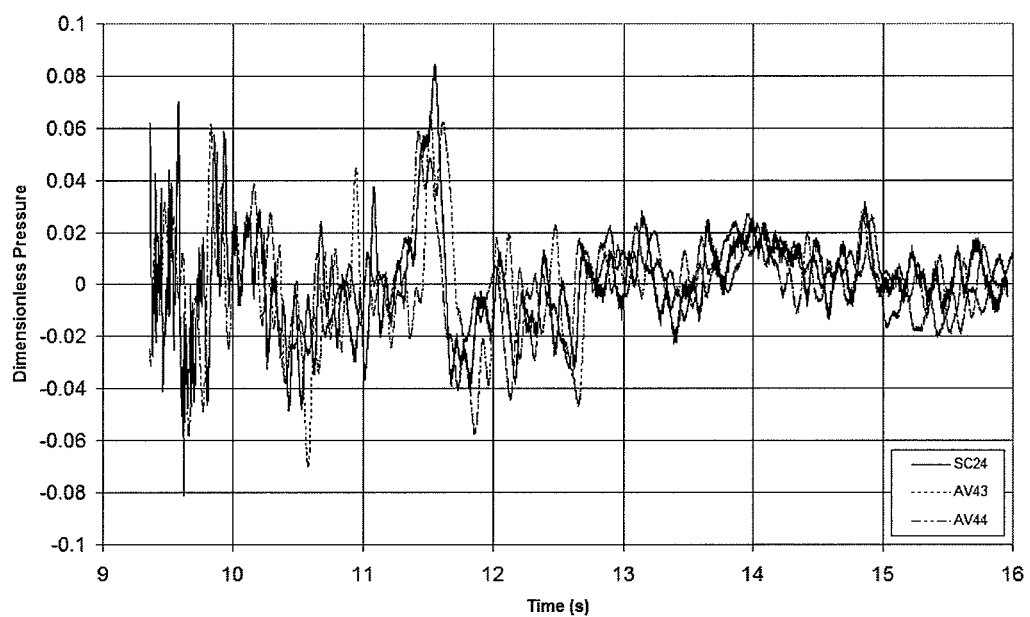
FIG. 12 is a plot of the measured pressure interaction signals illustrated in FIG. 2 after time shifting based on viewing variations in pipe condition to the left hand side of the generation location.

Referring now to FIG. 12, there is shown a plot of the pressure wave interaction signals after the pressure wave interaction signal associated with AV43 has been lagged and the signal associated with AV44 has been advanced. This has the effect of checking for or viewing variations of pipe condition to the left hand side of the generation location SC24. As is apparent from FIG. 12, there is significantly greater correlation between the signals corresponding to each measurement location indicating that the source of localised variation in pipe condition is to the left of SC24 and in this case to the left of AV43.

As can be seen with respect to FIG. 12, the now correlated pressure wave interaction signals from locations G (i.e. SC24), R1 (i.e. AV44) and L1 (i.e. AV43) may be employed to determine variations in pipe condition such as pipe wall thickness as has been described previously. In one embodiment, an average signal is calculated based on three of the signals. In another embodiment, the signal corresponding to the measurement location on the side of the variation in pipe condition with respect to the generation location is selected as this signal is closer to these variations.

As would be appreciated by those skilled in the art, this approach can be extended to multiple measurement locations and their associated measured pressure wave interaction signals. As a non limiting example, there could be 2, 3, 4, 5, 6 or more measurement locations and a generation location which is located such that all the measurements locations are located on one side of the generation location. Alternatively, the generation location might be in the middle with other measurement locations either side. The correct time shifting or compensation for each arrangement will then require consideration of the relative locations of the measurement points and the measured average wave speeds a for each pipe section between the various locations with different relative shifts revealing variation between different measurement locations.

Referring once again to FIG. 1, in another illustrative embodiment at step 140 the extent of variation of pipe condition is determined by first forming a full transient model of the pipe being assessed. Transient flow in pipes may be calculated using the fundamental unsteady continuity and momentum equations (see for example Wylie and Streeter, 1993 as referred to above)

$$\frac{\partial H}{\partial t} + \frac{a^2}{gA}\frac{\partial Q}{\partial x} = 0 \tag{3}$$

$$\frac{\partial H}{\partial x} + \frac{1}{gA}\frac{\partial Q}{\partial t} + h_f = 0 \tag{4}$$

after convective acceleration and slope terms have been neglected and where:

H is pressure head in meters,
Q is flow in $m^3.s^{-1}$,
x is a space coordinate,
t is a time coordinate,
a is as previously the wave speed,
A is the internal cross sectional area of the pipe in $m^2$; and
g is the gravitational constant.

The friction term ($h_f$) in equation 4 is calculated for laminar and turbulent flow using $$h_f = \frac{fQ|Q|}{2gDA^2} + \frac{16v}{gD^2A}\left(\frac{\partial Q}{\partial t} * W\right)(t) \tag{5}$$

where:

D is pipe diameter
W is the unsteady friction weighting function for laminar, smooth pipe turbulent or rough pipe turbulent flow,
f is the quasi-steady friction factor; and
v is the kinematic viscosity.

in which quasi-steady and unsteady friction are calculated using the first and second terms on the right hand side of equation 5 respectively. Unsteady friction is calculated by convolving the flow history throughout the transient event with an unsteady friction weighting function (see for example Zielke, W. (1968) 'Frequency-Dependent Friction in Transient Pipe Flow' *Journal of Basic Engineering*, Transactions of the ASME, 90(1), 109-115, the contents of which are herein incorporated by reference in their entirety).

In this illustrative embodiment, an efficient recursive approximation for unsteady friction for turbulent flow is utilised (see for example Vitkovsky, J., Stephens, M., Bergant, A., Lambert, M. F. and Simpson, A. R. (2004) 'Efficient and Accurate Calculation of Zielke and Vardy-Brown Unsteady Friction in Pipe Transients' 9th *International Conference on Pressure Surges*, BHR Group, Chester, UK, the contents of which are herein incorporated by reference in their entirety). Equations 3 and 4 can be solved numerically using the Method of Characteristics for solving partial differential equations along the characteristic grid using $$[H(x, t) - H(x - \Delta x, t - \Delta t)] + \tag{6}$$
$$\frac{a}{gA}[Q(x, t) - Q(x - \Delta x, t - \Delta t)] + a\Delta t h_f = 0$$

with $$h_f = \frac{fQ(x, t)|Q(x - \Delta x, t - \Delta t)|}{2gDA^2} \tag{7}$$

where
Δx is the spatial discretisation,
Δt is the time discretisation,
and $$[H(x, t) - H(x + \Delta x, t - \Delta t)] - \qquad (8)$$
$$\frac{a}{gA}[Q(x, t) - Q(x + \Delta x, t - \Delta t)] - a\Delta t h_f = 0$$

with $$h_f = \frac{fQ(x, t)|Q(x + \Delta x, t - \Delta t)|}{2gDA^2} \qquad (9)$$

Equations 6 and 8 are known as the $C^+$ and $C^-$ compatibility equations and can be rearranged and simplified to solve for head H along the $C^+$ and $C^-$ characteristic lines:

$$H(x, t)^+ = \left[H(x - \Delta x, t - \Delta t) + \frac{a}{gA}Q(x - \Delta x, t - \Delta t)\right] - \qquad (10)$$
$$\left[\frac{a}{gA} + \frac{f}{2gDA^2}a\Delta t|Q(x - \Delta x, t - \Delta t)|\right]Q(x, t)^+$$

which reduces to $H(x,t)^+ = C^+ - B^+ Q(x, t)^+$ (11)

and $$H(x, t)^- = \left[H(x + \Delta x, t - \Delta t) - \frac{a}{gA}Q(x + \Delta x, t - \Delta t)\right] + \qquad (12)$$
$$\left[\frac{a}{gA} + \frac{f}{2gDA^2}a\Delta t|Q(x + \Delta x, t - \Delta t)|\right]Q(x, t)^-$$

which reduces to $H(x,t)^- = C^- + B^- Q(x,t)^-$ (13)

where $C^+$ and $B^+$ correspond to the to the terms in square brackets in equation (10) and $C^-$ and $B^-$ correspond to the terms in square brackets in equation (12). The quantity a/gA is typically characterised as the pipeline impedance B.

These equations show that pressure variation is a function of, amongst other parameters, pipeline impedance B which is directly proportional to wave speed a and inversely proportional to the internal cross sectional area A of the pipe. For standard pipe geometries the effect of area variation is generally minor when compared to the effect of wall thickness and the associated change in elasticity. As in the case of this illustrative embodiment, the loss of the cement lining reduces the stiffness of the pipe wall by an amount proportional to the thickness and modulus of elasticity of the cement. Once exposed, the pipe wall begins to corrode leading to a reduction in the thickness of the metal retaining its original elastic modulus further decreasing the stiffness of the pipe wall.

If the pipe wall is damaged, and has lost cement lining and/or developed wall corrosion, wave speed a will decrease, and the internal cross sectional area A of the pipeline will increase, thereby resulting in a reduction of pipeline impedance B. Thus changes in pipe wall thickness and the integrity of the cement mortar lining lead to pressure variations and structured patterns of reflections in the transient response of a pipe due to the associated changes in impedance B at those locations.

In one embodiment, a transient model based on the compatibility equations was developed employing a spatial step of 5 meters and a time step of 0.0049261 seconds and the physical and geometrical properties of the pipe including the pipe's theoretical diameter and material elastic modulus, Poisson's ratio and the bulk modulus and density of the contained fluid. The hydraulic boundary conditions for the pipe were also theoretically determined and confirmed using steady state pressure measurements for the pipe at the measurement locations.

Once the transient model is complete, trial and error variation of the wave speed a for selected or all of the discrete 5 meter pipe sections along the pipe can be conducted to determine the predicted pressure wave interaction signal for the pipe when subject to the generation of a pressure wave as previously described. The hydraulic characteristics related to the induction of the pressure wave are included in the transient model by measured or inferred pressures and flows.

Varying the wave speed a for selected or all of the 5 meter pipe section along the pipe allows for the inclusion of the effect of changes in pipe wall thickness, elasticity and internal diameter and cross sectional area continuously along the pipe length. The impedance term B varies with these changes in wave speed and pipe internal cross sectional area and this in turn modifies the predicted pressure response from the transient model based on equations 10 and 12 referred to above. The predicted and measured responses at all measurement locations along the pipe (including G, L1 and R1) can then be compared after trial and error variation of the wave speeds over selected 5 m lengths of pipe until a satisfactory comparison is achieved. This method does not rely on the determination of average wave speed measurements between measurement locations as described in earlier embodiments.

Figure 13:
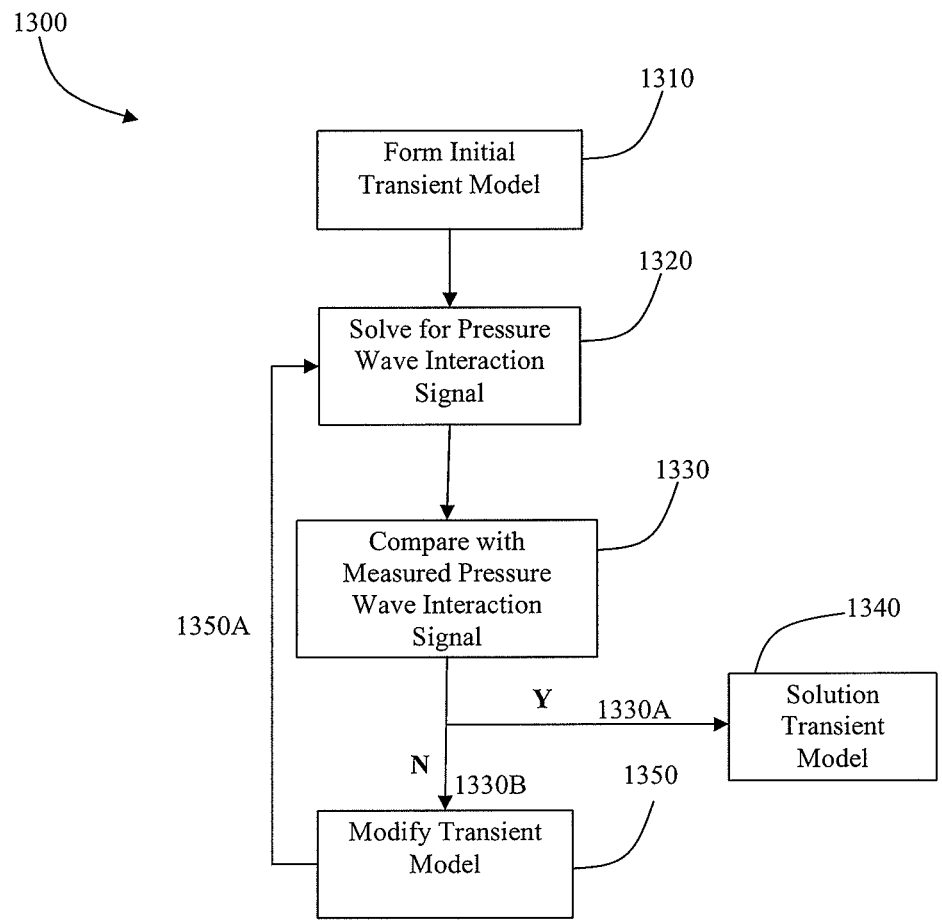
FIG. 13 is a flowchart diagram of an inverse transient method for determining the extent of a localised variation in pipe condition in accordance with an illustrative embodiment of the present invention.

In yet another illustrative embodiment, at step 140 the extent of variation of pipe condition is determined by a global search procedure based on the full transient model discussed above. Referring now to FIG. 13, there is shown a flowchart diagram of a method 1300 of determining the extent of localised pipe variation in accordance with another illustrative embodiment of the present invention.

At step 1310 an initial transient model is formed. In this illustrative embodiment, the initial transient model is formed over a total pipe length of 2000 meters with the pipe length divided into 5 meter sections giving 400 by 5 meter long pipe sections. As would be apparent to those skilled in the art these parameters can be varied according to the desired granularity of the solution and available computing power. As an example, where it is only necessary to localise variations to the nearest 100 meters, then the initial transient model could be formed over a total pipe length of longer distances without directly affecting the computer power required.

As described above, the initial transient model is based on the known physical characteristics of the pipe and fluid flow and serves as an initial solution to start the optimisation process. In another illustrative embodiment, the forming of the initial transient model includes preconditioning the model in accordance with an initial estimate of pipe variation. This initial estimate may be obtained from one or more of the following considerations including but not limited to:

gross estimates of wave speed variation obtained from pulse shape analysis or other means of determining average wave speed between measurement locations, multiple correlated time shifted pressure signals such as described with reference to FIGS. 10 to 12, the use of the Joukowsky pressure formulation to derive an initial set of wave speeds as a function of location, or an initial forward transient model obtained via a trial and error approach.

The use of preconditioning such as described above provide bounds for feasible values of wave speed (and hence wall thickness) along the pipe being modelled and in many instances can reduce the computational time required to generate a solution transient model. Taking once again the example of the field test pipeline, and the generation and measurement locations of scour valve 24, fire plug air valve 43 and fire plug air valve 44 as referred to with respect to FIGS. 10 to 12, as a result of the preconditioning analysis the initial number of 400×5 meter pipe sections was reduced to 150 which corresponded to a total length of 750 meters being modelled. An initial analysis also indicated that a lower wave speed/wall thickness bound for any 5 meter long section of pipe was 800 m/s (corresponding to approximately 2 mm wall thickness) based on in this case the maximum magnitude of the measured pressure reflections.

Figure 14:
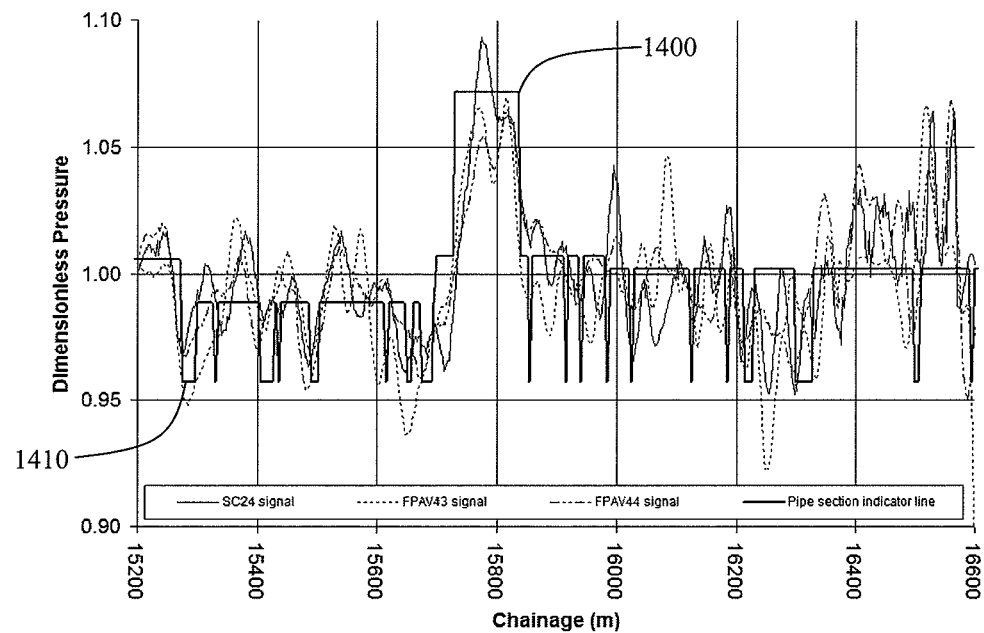
FIG. 14 is a plot of a section of pipe depicting locations of pipe sections to be modelled in accordance with the inverse transient method illustrated in FIG. 13.

Referring now to FIG. 14, there is shown by way of example one possible distribution of 5 meter pipe sections selected in the present analysis after examination of time shifted pressure interaction signals for a test conducted at scour valve 24 and further measurement locations FPAV43 and FPAV44 (see for example FIGS. 10 to 12). The modelled pipe sections are indicated by the floor portions 1410 of the solid pipe section indication line 1400. Other distributions are possible depending on the initial analysis of the time shifted pressure interaction signals. The accuracy of the preconditioning process may be improved by conducting tests at closer intervals and/or using different distributions of 150×5 meter long sections of pipeline during inverse transient analysis noting that the length of 750 meters is cumulative only and can comprise individual 5 meter pipe lengths with any distribution along a 1.5 km to 6 km section of pipeline.

At step 1320, the initial transient model is solved to generate a pressure wave interaction signal which at step 1330 is compared with the measured pressure wave interaction signal. This comparison process involves forming a difference measure which in this illustrative embodiment is based on a least squares minimisation of the sum of the square of the differences between the normalised predicted and measured pressure wave interaction signals. This sum is referred to as the objective function during the global search optimisation with the aim being to identify the lowest objective function. If this difference measure is less than a threshold or represents a minimum value 1330A then the corresponding transient model is nominated as the solution transient model 1340. If the difference measure is above the threshold or determined not to be a minimum value 1330B then the transient model is modified 1350. This method is generally referred to throughout the specification as the inverse transient model approach or method as variations in pipe conditions are derived from the measured pressure wave interaction signal.

In this illustrative embodiment, both Genetic Algorithm (GA) and Shuffled Complex Evolution (SCE) global probabilistic search procedures are used to modify 1350 the transient model for each iteration 1350A. In this case, each of the 150×5 meter pipe sections have their wave speeds varied in the transient model in a systematic way by the global search procedure in successive iterations until a pattern of wave speeds is identified which minimises the difference between the measured pressure wave interaction signal and that predicted for the new modified transient model as determined in the comparison step 1330.

Referring now to FIGS. 15 to 21, a number of analyses were conducted using first the GA search procedure. The first analysis (i.e. GA1) was undertaken with the parameters listed in Table 2, an initial wave speed of 915 m/s for each 5 meter pipe length and a wave speed bound of 800-1000 m/s. The second analysis (i.e. GA2) was undertaken with the same parameters listed in Table 2 but with an initial wave speed of 915 m/s for each 5 m pipe length and a wave speed bound of 700-1100 m/s. In this case this range was outside that predicted from the initial preconditioning analysis. The simulation/analysis for both GA1 and GA2 took approximately 24 hours to complete on a data processor such as a PC.

TABLE 2

| Parameter | Value |
| --- | --- |
| Cross-over probability | 0.9 |
| Diagonal cross-over probability | 0.35 |
| Mutation probability | 0.1 |
| Members in tournament | 2 |
| Number of populations replaced in each generation | 10 |
| Maximum number of generations | 9000 |
| Relative improvement per generation | 0.01 |
| Maximum number of evaluations | 50000 |
| Maximum number of generations without improvement | 1000 |
| Number of populations in each generation | 150 |
| Possible values in parameter range | $2^6 = 64$ |

The analysis conducted using the SCE search procedure employed the parameters listed in Table 3 below. In this case the analysis used an initial wave speed of 915 m/s for each pipe length and a wave speed bound of 700-1100 m/s with simulation/analysis taking approximately 168 hours to complete on a PC.

TABLE 3

| Parameter | Value |
| --- | --- |
| Number of complexes | 150 |
| Penalty for value outside of bounds | 10000 |
| Penalty exponent | 2 |
| Relative tolerance per shuffle | 1.0e−06 |
| Maximum number of evaluations | $10^7$ |
| Maximum number of shuffles after tolerance met | 2 |
| Possible values in parameter range | Continuous |

Figure 15:
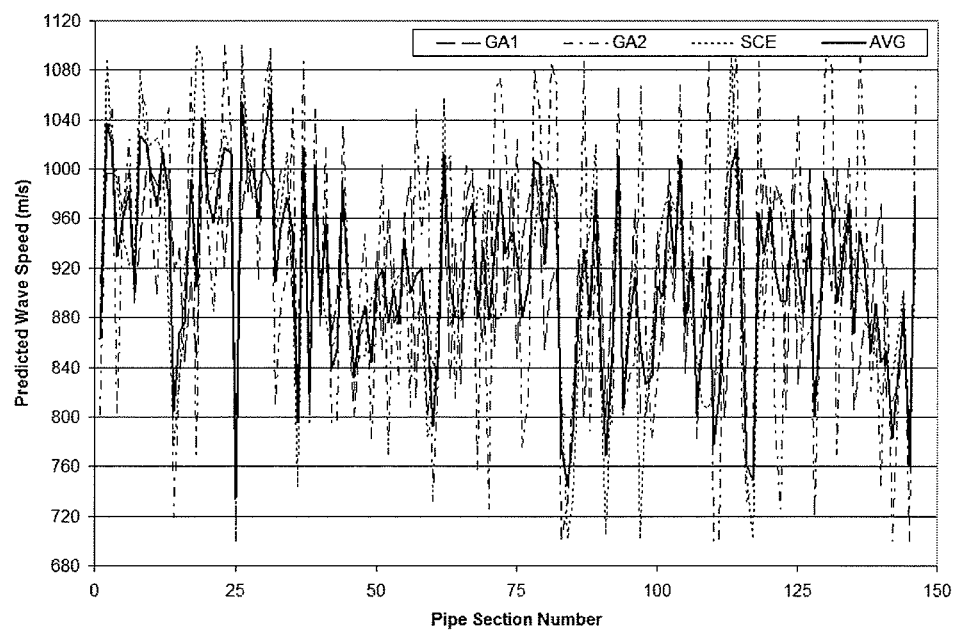
FIG. 15 is a plot of the predicted wave speeds for different global search procedures applied in accordance with the inverse transient method illustrated in FIG. 13.

Referring now to FIG. 15, there is shown a plot of predicted wave speed variation along the 150×5 m pipe lengths referred to in FIG. 14 for the various search procedures employed. As can be confirmed by inspection of FIG. 15, the results for GA1 and GA2 vary more significantly than those obtained using the SCE. This is thought to principally stem from the reduced number of iterations adopted with the GA procedures as compared to the SCE procedure (i.e. 50,000 evaluations compared to 10,000,000 evaluations). This also accounts for the short duration of the analysis for GA1 and GA2 relative to the duration of the analysis conducted using the SCE.

The deviation in fitted wave speeds is also greater for GA2 than GA1 due primarily to the increase in the range of the bounds from 800-1000 m/s to 700-1100 m/s. The fitted wave speeds obtained using the SCE are stable and similar to the average of the fitted wave speeds obtained using GA1, GA2 and the SCE despite the broader bounds for the wave velocity range of 700-1100 m/s indicating that for this analysis at least that the SCE procedure is to be preferred. However, as would be appreciated by those skilled in the art other search procedures may be employed depending on the circumstances which would include the available computing power of the data processor that carries out the computational task.

Figure 16:
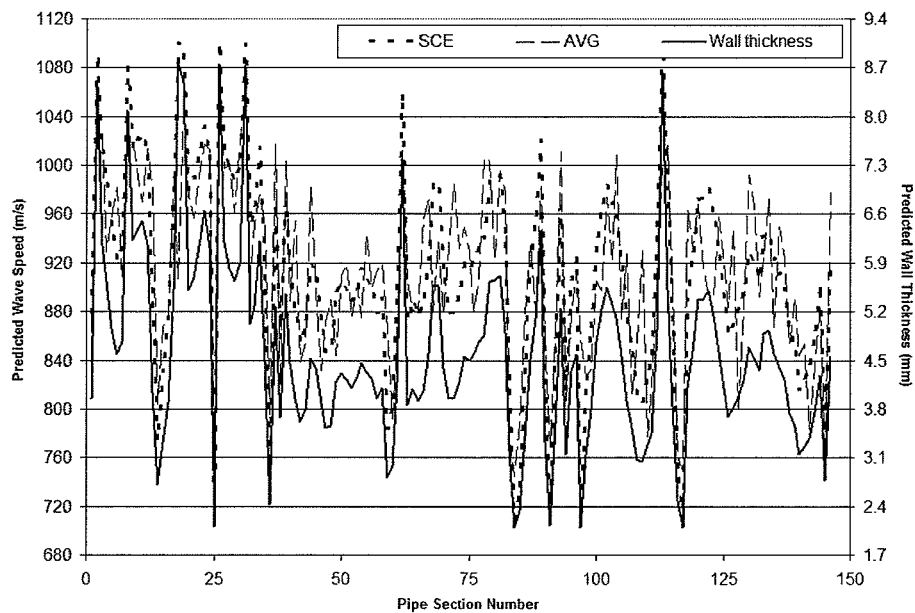
FIG. 16 is a plot of the predicted average wave speeds based on the predicted wave speeds illustrated in FIG. 15.

Referring now to FIG. 16, there is shown the results of the inverse transient method in terms of the fitted wave speeds obtained using SCE and the average of GA1, GA2 and the SCE together with the corresponding predicted wall thickness variations for each of the 150×5 m pipe lengths fitted. The correlation between the average wave speed/wall thickness obtained from GA1, GA2 and the SCE and the wave speed/wall thickness obtained using the SCE (only) is clear. The wave speed bounds from 700-1100 m/s correspond to wall thickness variations of 2-9 mm. The wall thickness shown in FIG. 16 is derived from the predicted wave speed variations obtained using only the SCE procedure to show the conversion from the fitted wave speed to wall thickness.

Figure 17:
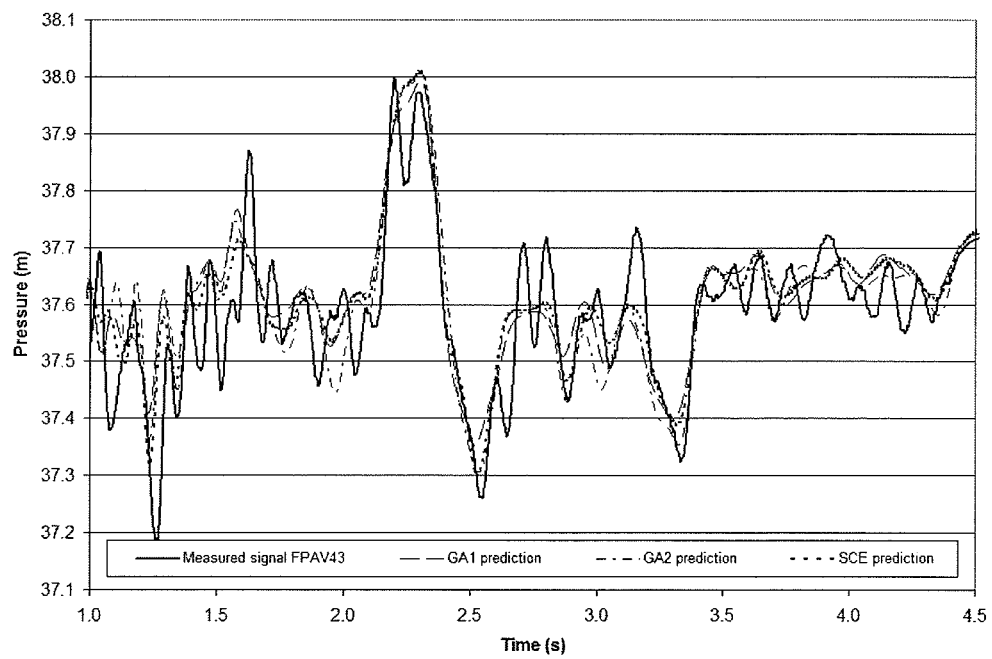
FIG. 17 is a plot of the measured pressure wave interaction signal measured at a first location and the predicted solution pressure wave interaction signal for different global search procedures applied in accordance with the inverse transient method illustrated in FIG. 13.
Figure 18:
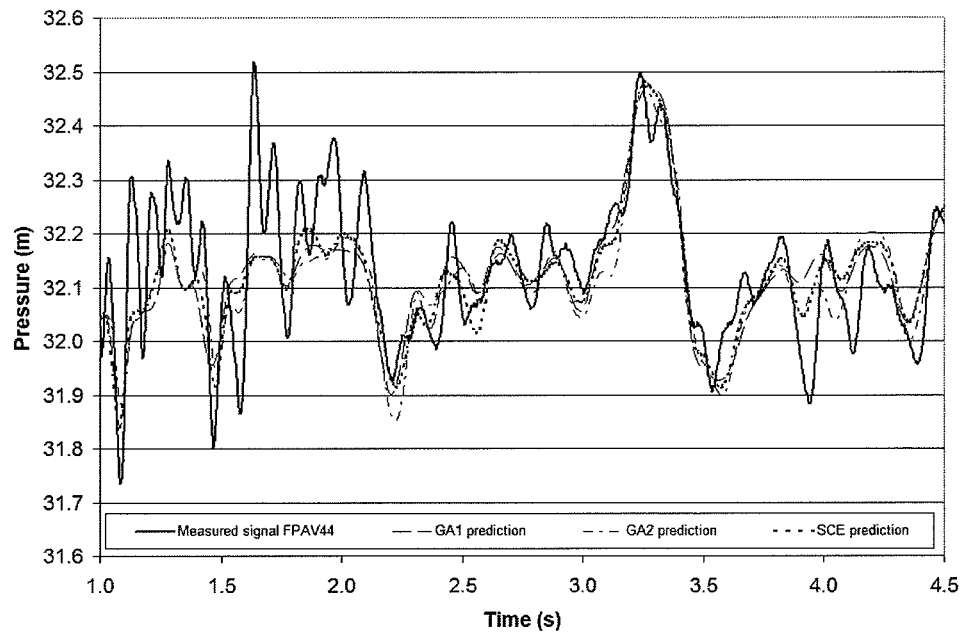
FIG. 18 is a plot of the measured pressure wave interaction signal measured at a second location and the predicted solution pressure wave interaction signal for different global search procedures applied in accordance with the inverse transient method illustrated in FIG. 13.

Referring now to FIG. 17, there is shown a comparison plot of the measured pressure interaction signal corresponding to measurement location FPAV43 and the predicted pressure wave interaction signals resulting from the GA1, GA2 and SCE search procedures. As is apparent from FIG. 17, the fit between the predicted and measured signals is marginally better with the GA2 and SCE procedures as compared to the GA1 procedure. As can be seen, the distinctive positive and negative pressure reflections (corresponding to thicker and thinner walled lengths of pipe) are accurately replicated using the transient model of the field test pipeline in combination with the global search procedure. Similarly, FIG. 18 shows a similar comparison plot except that this time the measurement location is FPAV44. Again a satisfactory match between the predicted pressure wave interaction signal and the measured pressured wave interaction signal is apparent for this location.

Figure 19:
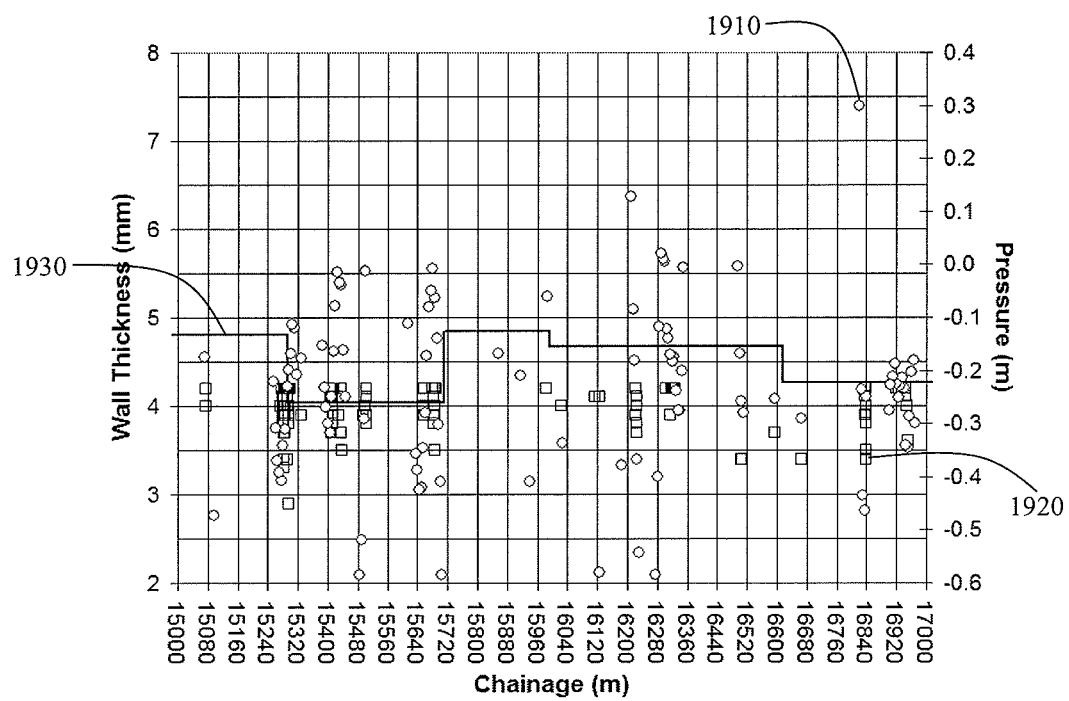
FIG. 19 is a plot of the predicted wall thickness as a function of location along the pipe compared with the average wave speed measurements and direct ultrasonic measurement of wall thickness.

Referring now to FIG. 19 there is shown the results of the SCE procedure (indicated as circles 1910) referred to above plotted over a 2 kilometer section of pipe as compared to experimental ultrasonic measurements of wall thickness (indicated as squares 1920). Also shown is a plot of the average wave speed a for the corresponding pipe sections (indicated as solid line 1930). The portion of pipe depicted is located approximately 2 kilometers to the left of SC24 referred to earlier and is located at chainage locations 15000 meters to 17000 meters on the field test pipeline.

For each comparison location on the pipe eight each equally spaced ultrasonic measurements are taken about the circumference of the pipe. This takes into account that changes in pipe thickness can vary substantially moving about the circumference of the pipe and not necessarily be evenly distributed as would result from a uniform thickness decrease in the wall of the pipe. This serves to highlight that standard methods for experimental determination of pipe thickness are generally extremely labour intensive and costly. As such, the indicated ultrasonic measurements correspond to where the variation from expected wall thickness is more (in absolute magnitude) than negative 0.56 mm for a comparison location i.e. ultrasonic measurements (from any one of the 8 circumferential points around a pipe cross-section) are shown where the remaining pipe wall thickness is less than 4.2 mm (original thickness of metal 4.76 mm). Accordingly, where there may be significant wall thickness reduction around the circumference of the pipe at a given location there will be multiple measurements indicated. It should be noted that the ultrasonic thickness measurements were undertaken at 5 m intervals along 2 kms of pipe between 15000 and 17000 meters and that the ultrasonic thickness measurements shown are not biased to the comparison locations.

From an inspection of FIG. 19 it can be shown that the average wave speed a (as indicated by 1930) for the corresponding pipe sections provides only limited information when compared to the results of the inverse transient method. As an example, while it is evident that the average wave speed a between measurement locations is depressed between chainage 15280-15700 meters and that this corresponds with a section of pipeline along which significant damage has been confirmed by ultrasonic measurement it does not however provide clarification as to the extent and/or magnitude of damage along the 420 meters of pipe between measurement locations. The results of the inverse transient method clearly indicate significant localised variations in pipe condition at four locations in this pipe section.

Another example of where the present invention provides significantly more information than prior art methods can be seen at chainages of 16840 meters and 16920 meters where the ultrasonic measurements indicate significant wall thickness reduction which although limited in extent is still nevertheless significant in magnitude. Although, the average wave speed a does not indicate significant overall damage for the pipe section it can be seen that the SCE thicknesses obtained from the inverse transient method identify these specific locations to a 5 meter resolution.

Figure 20:
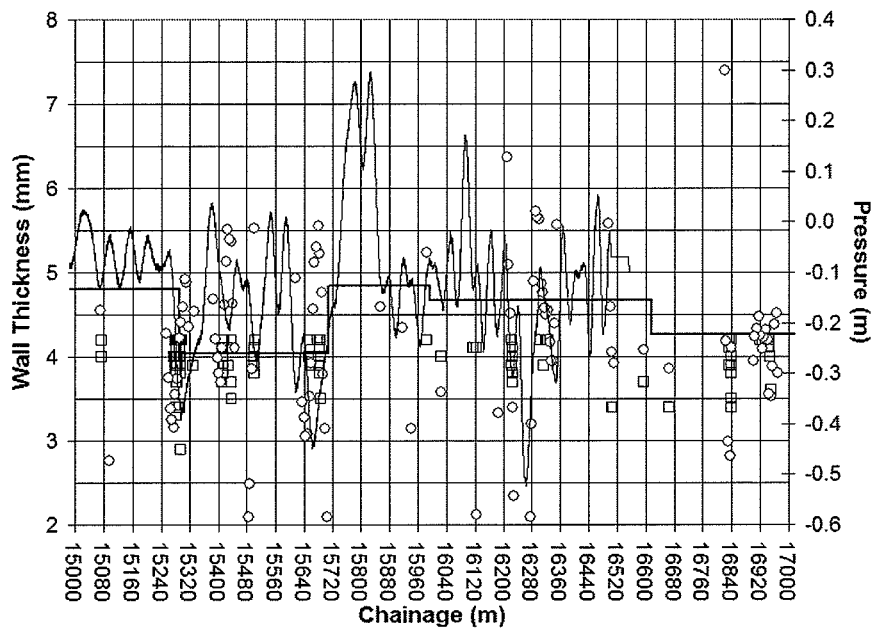
FIG. 20 is the plot of FIG. 19 overlaid with a pressure wave interaction signal measured at a first location along the pipe.
Figure 21:
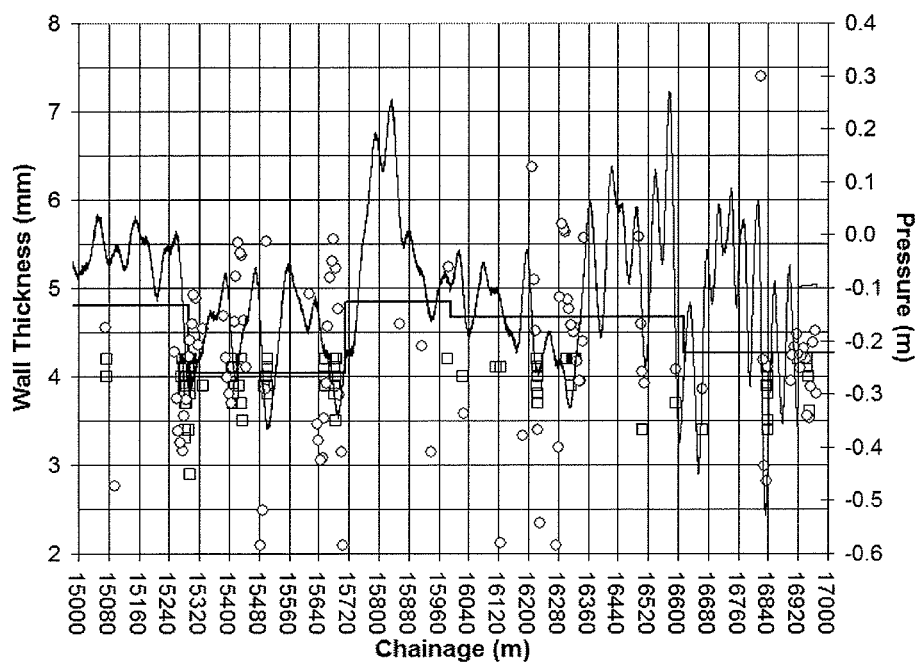
FIG. 21 is the plot of FIG. 19 overlaid with a pressure wave interaction signal measured at a second location along the pipe.

Referring now to FIGS. 20 and 21, further confirmation of the results of the inverse transient method can be obtained by overlaying the results of the time shifted pressure wave interaction signal for associated measurement locations. In FIG. 20, the time shifted pressure wave interaction signal obtained from FPAV43 is overlaid on the plot shown in FIG. 19. The correlation between the measured pipe wall thickness reduction, the time shifted signal and the results of the inverse transient method between chainage 15280-15700 meters clearly shows the four locations of significant thickness reduction as referred to earlier. Similarly, in FIG. 21 the time shifted pressure wave interaction signal obtained from FPAV43 is overlaid on the plot shown in FIG. 19 once again clearly indicating correlation between the measured pipe wall thickness reduction, the time shifted signal and the results of the inverse transient method at chainages of 16840 meters and 16920 meters.

As would be apparent to those of skilled in the art, the various embodiments described herein provide a method and system for assessing localised variations in pipe condition without having to conduct a detailed physical examination of the pipe whether by methods such as ultrasonic measurement or CCTV inspection. Furthermore, the various embodiments described herein allow the locations of variations to be isolated within a pipe section and compare favourably with those methods such as average wave speed reduction which can only give an average measure of condition over an extended pipe section.

The term "transient" as used throughout the specification is to be understood as one example of a pressure wave that may be generated in a pipe. The transient is a form of water hammer phenomena (if the fluid medium is water) and is created by a controlled change in the flow and pressure conditions in the fluid contained within the pipeline. Other examples include an acoustic signal or mechanical or otherwise generated impact pressure wave in the fluid medium. The pressure waves that are generated are fundamentally similar whether created by a "transient", acoustic or impact input.

While the present invention is described in relation to the assessment of pipeline condition where the pipes are used for distribution or transmission of water it will be appreciated that the invention will have other applications consistent with the principles described in the specification. For example, any pressurised pipeline containing sewage (effluent), petroleum or other fluid can be tested using the invention to determine variations in pipe wall condition and weaknesses. The present invention may also be applicable to the location of variations in pipe wall thickness for pipes carrying gases as these variations will cause corresponding features in a pressure wave interactions signal caused by generating a pressure wave in the gas.

As would also be appreciated by those skilled in the art the present invention is applicable to all manner and variation of pipes having different cross sectional geometries whether constant, varying or jointed. In addition the present invention will be applicable to pipes of formed of different materials including but not limited to:

metal pipes whether formed of cast iron, mild steel, ductile iron or stainless steel, ceramic pipes such as reinforced concrete pipe, asbestos cement pipe or pipes formed of vitreous clay; or plastic pipes such as pipes formed of polyvinyl chloride (PVC), high density polyethylene (HDPE), glass reinforced plastic or acrylonitrile butadiene styrene (ABS).

Additionally, the present invention will be applicable to any combination of these materials such as concentric composites where two or more materials are employed to form the pipe wall or series composites where the pipe material is varied longitudinally along the pipe.

The reference to any prior art in this specification is not, and should not be taken as, an acknowledgement of any form of suggestion that such prior art forms part of the common general knowledge. Further discussion of the present invention and associated illustrative embodiments may also be found in:

Stephens, M. L. (2008) Transient Response Analysis for Fault Detection and Pipeline Wall Condition Assessment in Field Water Transmission and Distribution Pipelines and Networks, PhD Thesis, The University of Adelaide, School of Civil, Environmental and Mining Engineering, Adelaide, South Australia; and Stephens, M. L., Simpson, A. R. and Lambert, M. F. (2008) "Internal Wall Condition Assessment for Water Pipelines Using Inverse Transient Analysis", Proceedings of the 10th Annual Water Distribution Systems Analysis Conference WDSA 2008, Van Zyl, J. E., Hemobade, A. A., Jacobs, H. E. (eds.), Aug. 17-20, 2008, Kruger National Park, South Africa, whose entire contents are incorporated by reference in their entirety.

Although illustrative embodiments of the method and system of the present invention have been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A method for assessing the extent and localization of localized variations in pipe condition along a length of a pipe carrying a fluid, the method including:

generating at a source location a pressure wave in the fluid being carried along the pipe;

detecting a plurality of pressure wave interaction signals at respective measurement locations spaced apart along the pipe, and the plurality of pressure wave interaction signals resulting from an interaction of the pressure wave with localized variations in pipe condition along the length of the pipe, the pressure wave interaction signals characterizing the entire length of the pipe to be assessed;

dividing the length of the pipe into a plurality of predetermined pipe sections corresponding to different locations extending along the length of the pipe; and determining from a timing structure of the pressure wave interaction signals the extent of the localized variations in pipe condition at each of the pipe sections corresponding to a location along the length of the pipe based on a characteristic of the pressure wave interaction signals.

2. The method for assessing the extent and location of localized variations in pipe condition along the length of the pipe carrying the fluid as claimed in claim 1, wherein the characteristic of the pressure wave interaction signals is a change in a magnitude of the pressure wave interaction signals.

3. The method for assessing the extent and location of localized variations in pipe condition along the length of the pipe carrying the fluid as claimed in claim 1, wherein the localized variations in pipe condition for each pipe section corresponding to a location along the length of the pipe include variations in elastic stiffness of a pipe wall of the pipe.

4. The method for assessing the extent and location of localized variations in pipe condition along the length of the pipe carrying the fluid as claimed in claim 1, wherein the localized variation in pipe condition for each pipe section corresponding to a location along the length of the pipe includes a variation in thickness of a pipe wall of the pipe.

5. The method for assessing the extent and location of localized variations in pipe condition along the length of the pipe carrying the fluid as claimed in claim 1, wherein the localized variations in pipe condition for each pipe section corresponding to a location along the length of the pipe include variations of internal cross sectional area of a pipe wall of the pipe.

6. The method for assessing the extent and location of localized variations in pipe condition along the length of the pipe carrying the fluid as claimed in claim 1, wherein the generating a pressure wave includes changing at least one of a pressure or flow characteristics of the fluid at a source location along the pipe.

7. The method for assessing the extent and location of localized variations in pipe condition along the length of the pipe carrying the fluid as claimed in claim 6, wherein changing the at least one of the pressure or flow characteristics includes discharging fluid from the pipe at the source location and then stopping the discharge.

8. The method for assessing the extent and location of localized variations in pipe condition along the length of the pipe carrying the fluid as claimed in claim 1, wherein each pressure wave interaction signal is a pressure wave reflectance signal reflected from the localized variations in pipe condition towards an origin of the pressure wave.

9. The method for assessing the extent and location of localized variations in pipe condition along the length of the pipe carrying the fluid as claimed in claim 1, wherein each pressure wave interaction signal is compensated for pressure effects caused by generating the pressure wave in the pipe.

10. The method for assessing the extent and location of localized variations in pipe condition along the length of the pipe carrying the fluid as claimed in claim 1, wherein the determining the locations of pipe sections corresponding to the localized variations in pipe condition includes compensating for average wave speed in a for the pipe section of the pipe.

11. The method for assessing the extent and location of localized variations in pipe condition along the length of the pipe carrying the fluid as claimed in claim 1, wherein the determining the extent of localized variation at each of the pipe sections includes converting a change in magnitude of the pressure wave interaction signals to localized variations in wave speed of the pressure wave.

12. The method for assessing the extent and location of localized variations in pipe condition along the length of the pipe carrying the fluid as claimed in claim 11, further including converting the localized variations in wave speed of the pressure wave to a corresponding localized wall thickness.

13. The method for assessing the extent and location of localized variations in pipe condition along the length of the pipe carrying the fluid as claimed in claim 1, wherein the determining the extent of the localized variations in pipe condition at each of the pipe sections includes forming a transient model of the pipe to provide a plurality of predicted pressure wave interaction signals.

14. The method for assessing the extent and location of localized variations in pipe condition along the length of the pipe carrying the fluid as claimed in claim 13, wherein the determining the extent of the localized variations in pipe condition at each of the pipe sections further includes modifying the transient model to generate a plurality of predicted pressure wave interaction signals to match the detected pressure wave interaction signals.

15. The method for assessing the extent and location of localized variations in pipe condition along the length of the pipe carrying the fluid as claimed in claim 14, wherein a global search optimization procedure is employed in the modifying the transient model to generate the plurality of predicted pressure wave interaction signals.

16. The method for assessing the extent and location of localized variations in pipe condition along the length of the pipe carrying the fluid as claimed in claim 1, wherein the measurement locations include the source location.

17. A system for assessing the extent and location of localized variations in pipe condition along a length of a pipe carrying a fluid, the system including:
  a pressure wave generator located at a source location for generating a pressure wave in the fluid being carried along the pipe;
  a plurality of pressure detectors for detecting a plurality of pressure wave interaction signals at respective measurement locations spaced apart along the pipe, the plurality of pressure wave interaction signals resulting from an interaction of the pressure wave with localized variations in pipe condition along the length of the pipe; and
  a data processor configured to divide the length of the pipe in a plurality of predetermined pipe sections corresponding to different locations extending along the length of the pipe and to determine from a timing structure of the plurality of pressure wave interaction signals the extent of the localized variations in pipe condition at each of the pipe sections corresponding to a location along the length of the pipe based on a characteristic of the pressure wave interaction signals.

18. The system for assessing the extent and location of localized variations in pipe condition along the length of the pipe carrying the fluid as claimed in claim 17, wherein the data processor is configured to determine from the timing structure of the plurality of pressure wave interaction signals the extent of the localized variations in pipe condition by forming a transient model of the pipe to provide a plurality of predicted pressure wave interaction signals.

19. The system for assessing the extent and location of localized variations in pipe condition along the length of the pipe carrying the fluid as claimed in claim 18, wherein the data processor is configured to modify the transient model to generate the plurality of predicted pressure wave interaction signals to match the detected pressure wave interaction signals.

20. The system for assessing the extent and location of localized variations in pipe condition along a length of a pipe carrying the fluid as claimed in claim 19, wherein, the data processor is configured to use a global search optimization procedure to modify the transient model to generate the plurality of predicted pressure wave interaction signals.

* * * * *